United States Patent [19]

Crump et al.

[11] 3,835,521

[45] Sept. 17, 1974

[54] GRAVITY-FED SELECTABLE PIN INSERTION DEVICE

[75] Inventors: Robert O. Crump, Scottsdale; Karl R. Bethsold, Phoenix, both of Ariz.

[73] Assignee: Honeywell Information Systems, Inc., Waltham, Mass.

[22] Filed: Sept. 4, 1973

[21] Appl. No.: 393,870

[52] U.S. Cl. .......... 29/203 B
[51] Int. Cl. .......... H05k 13/04
[58] Field of Search .......... 29/203 B, 203 D, 203 R, 29/203 P, 429

[56] References Cited

UNITED STATES PATENTS 3,528,160 9/1970 Wadleigh .......... 29/429
3,601,890 8/1971 Pityo .......... 29/203 D X
3,611,561 10/1971 Dosier .......... 29/203 P X
3,765,075 10/1973 Olney, Jr. et al. .......... 29/203 B

*Primary Examiner*—Thomas H. Eager
*Attorney, Agent, or Firm*—L. B. Guernsey; E. W. Hughes

[57] ABSTRACT

A pin insertion device which uses gravity to feed pins into a hopper employs a plurality of partitions to align the pins with a plurality of ports in one wall of the hopper. The pins are held in alignment by the ports and by grooves in the bottom of the hopper. A plurality of pushers may be selectively activated to move selected pins through the ports into boards or other receivers which are positioned adjacent the ports.

4 Claims, 13 Drawing Figures

GRAVITY-FED SELECTABLE PIN INSERTION DEVICE

BACKGROUND OF THE INVENTION

The present invention pertains to a selectable pin insertion device and more particularly to a device which uses gravity to feed a plurality of straight pins into alignment with a plurality of ports in a hopper. A plurality of pushers is used to selectively move the pins through the ports and force the pins into boards or other receivers which are positioned adjacent the hopper.

Modern electronic equipment such as high speed data processing system uses microelectronic circuits to reduce the physical size of the system and to increase the operating speed and reliability. These microcircuits are built in modules each of which may replace a large number of circuits using discrete circuit components. A plurality of these modules may be mounted on a circuit board and a plurality of these boards mounted in a cabinet. It is often necessary to make electrical connection between modules which are mounted on a given circuit board and to connect modules on one board with modules on another board. One of the most reliable methods of connecting modules on one board with modules on another board is to insert connector pins into the circuit board and to wrap one end of a connecting wire around the pin and solder the other end of the wire to a connection on a circuit module. Other wires and cables may then be used to connect pins on one circuit board with pins on other circuit boards.

The complexity of circuits used in data processing systems may require that hundreds of connector pins be used on each of the circuit boards. These pins may be forced by high pressure into the circuit boards at right angles to the surface of the boards. There have been many attempts to develop devices or machines which will rapidly and accurately place these pins at the desired positions on the circuit boards. Some prior art machines use a plurality of pins inserted in a belt which moves past an insertion head. These belts are bulky, inconvenient and expensive. These prior art machines insert only one pin at a time into the board so that a relatively long time duration is required to insert the hundreds of pins needed in some circuit boards.

Other prior art machines use a loader to align loose straight pins and to supply these aligned pins to a multipin insertion head. These prior art machines simultaneously insert a plurality of pins into a circuit board but must insert the same number of pins each time the insertion head is moved against the board. For example, if a 7-pin connector is to be used with a given circuit board, the machine may use a 7-pin loader so the head inserts a cluster of seven pins into the board each time the head is moved against the board. If it is desired to insert a cluster of eight pins into the board the 7-pin loader must be removed from the pinning machine and an 8-pin loader must be installed on the machine. Thus, it is necessary to change the pin loader on the machine each time a different cluster pattern of pins is inserted into the circuit board. When more than one cluster pattern is included on the same circuit board it may be necessary to change the pin loader several times for each circuit board. This increases the time and expense of building the circuit boards.

The present invention alleviates some of the disadvantages of the prior art machine by including a pin insertion device and loader which can be programmed to provide a single pin or a plurality of pins to the insertion head so that the insertion head may insert a single pin or may simultaneously insert a plurality of pins into the circuit board. One embodiment of the insertion device can provide a single pin or 7 pins or 8 pins so that the insertion head can insert a single pin, or can insert 7 pins simultaneously or can insert 8 pins simultaneously. Another embodiment of the insertion device can provide a single pin from the right side of the device, or a single pin from the left side of the device, or two pins from the center of the device plus one from either side of the device. Other combinations of pins could be inserted into the board by building a pin insertion device which uses the principles which are disclosed in the present application.

It is, therefore, an object of this invention to provide a new and improved device for inserting pins into a board.

Another object of this invention is to provide an improved device for simultaneously inserting a plurality of pins into a board.

A further object of this invention is to provide a device which can be programmed to insert a predetermined number of pins simultaneously into a board.

Still another object of this invention is to provide a pin loader which can selectively provide a predetermined number of pins to a pin insertion head.

A further object of this invention is to provide a pin loader which delivers selected pins to a pin insertion head.

SUMMARY OF THE INVENTION

The foregoing objects are achieved in the instant invention by providing a new and improved selectable pin loader or a pin insertion device which uses loose, straight pins. These loose pins are fed by gravity into a hopper which has a plurality of partitions. Here the pins are aligned by the partitions. A plurality of moving pushers forces the aligned pins through a plurality of ports in one wall of the hopper into a pin insertion head which is positioned adjacent the ports. The pin insertion head is moved into a position adjacent a board and the pins are forced from the head into the board. The number of pushers which are activated determine the number of pins which are moved from the loader into the head. The number of pins which are moved into the head determine the number of pins which are simultaneously forced into the board. The insertion device may also be used to force the pins directly into a board positioned adjacent the ports in the wall of the hopper.

Other objects and advantages of this invention will become apparent from the following description when taken in connection with the accompanying drawings.

DESCRIPTION OF THE PREFERRED EMBODIMENT

Since the present invention pertains to pin insertion machines and to a portion of a pin insertion machine which can select the number of loose straight pins which can be simultaneously inserted into a circuit board, a description thereof can become very complex. However, it is believed unnecessary to describe all of the details of such a pin insertion machine to completely describe the present invention. Therefore, most of the details which are relatively well-known in the art will be omitted from this description. Even though details will be eliminated a basic description will be given of the entire machine to enable one skilled in the art to understand the environment in which the present invention is placed. Accordingly, reference is made to FIG. 1 showing a portion of a pin insertion machine which uses the present invention.

Figure 1:
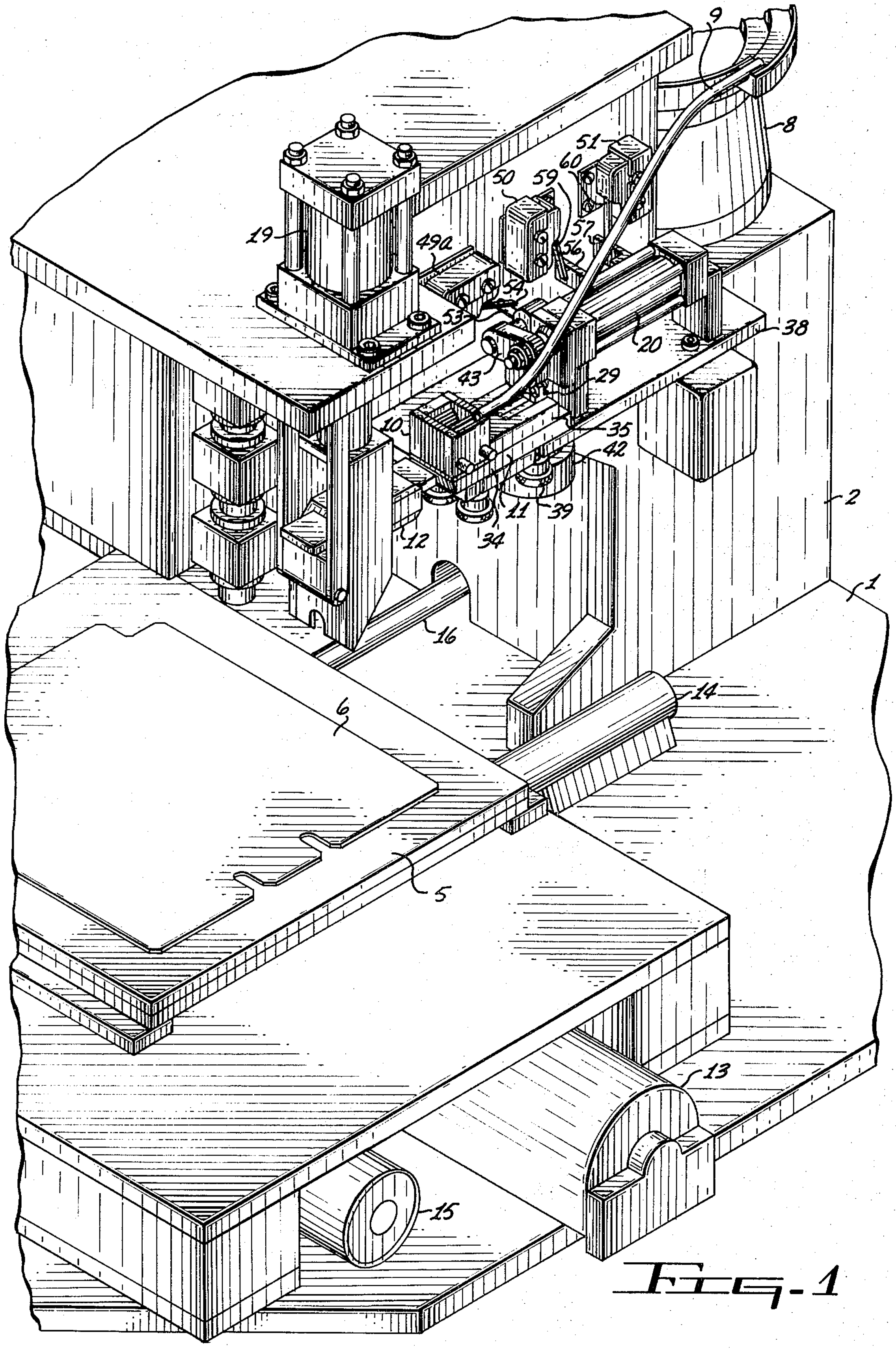
FIG. 1 is an isometric side view of apparatus embodying the present invention.

FIG. 1 comprises an isometric side view of a portion of a pin insertion machine embodying the present invention. While FIG. 1 shows only one pin loader or insertion device, it should be understood that the apparatus of FIG. 1 may include means for pinning two or more boards simultaneously. Included in FIG. 1 are a platform 1, a support 2 and a movable table 3. Mounted on the table 3 is a board support 5 and a circuit board 6. The platform 1 may be mounted on a base or cabinet (not shown). Within the base or cabinet is a power supply for the apparatus, the required circuitry and logic, motors, transformers, pulse generators for controlling movement of drive motors, cooling fans, and other necessary and associated components.

The platform also provides support for circuit boards through a pair of moving drive units referred to generally as the Y drive unit and the X drive unit, respectively. A pair of guide rods 14, only one of which is shown in FIG. 1, provides support and guidance for Y drive units which move "in" and "out" to move the boards in and out for pinning operations. The X drive unit is supported on and moves with the Y drive unit as it moves in and out. The X drive unit moves on a pair of guide rods (not shown) and moves in what is termed the X direction, either "left" or "right". A circuit board 6 is secured to the board support 5 for the pinning operations. Appropriate locating apparatus and securing apparatus are used to index and hold each board on the table for the proper pinning of the boards.

Movement of the X and Y drive units is controlled separately by a pair of drive motors (not shown). The indexing and moving of each drive unit to move the table in discrete increments is controlled through a pair of servo sensor systems. Each photo sensor system includes light sources and photo cells connected to the motor drive circuitry through appropriate amplifiers. Each photo sensor system also includes a metal strip appropriately fastened to each drive unit, with a plurality of holes or apertures drilled or punched through the strip at appropriate intervals so as to define the discrete increments or distances for the table to move. There are stop holes for incremental stops and limit holes for changing the direction of travel at the "in" and "out" and "left" and "right" limits of travel for the Y and X table movements respectively. In addition to a photo cell and light source for controlling the X and Y movements of the table incrementally for row and column pinning operations, each photo sensor system includes a second photo cell and light source for sensing X and Y limits of movement for the table. Each punched metal strip accordingly includes limit holes at opposite ends of each strip to denote the X and Y limits of travel for the table. Holes may also be provided to indicate the number of pins to be inserted at each position of the table. For sensing the limits, a separate photo cell and light source and amplifier is used because a reversal of directions is required and accordingly a different or separate signal is needed. A paper tape reader or a punched card reader may be used to provide signals which control the movement of the X and Y drive units and control the operation of the pin insertion device. When the board in the machine has been completely pinned the power circuit is interrupted and the table is then manually moved "out" until the Y "out" limit is reached. The complete board or boards are removed and a new board or boards secured in its place. The complete X and Y drive units, including the guide rods, motors and sensors for positioning the table may be purchased from several manufacturers. A more complete description of the operation of a typical incremental system for moving the circuit boards may be found in the patent application "Method and Apparatus for Inserting Pins Into A Circuit Board" by Frederick D. Olney, Jr. et al., Ser. No. 215,970 filed Jan. 3, 1972, now U.S. Pat. No. 3,765,075 and assigned to the assignee of the present invention.

The platform or table 1 also provides support for pin feeding and loading apparatus. The pin feeding apparatus includes a main feeder bowl 8 disposed on a support 2, a delivery tube 9 extending from the main bowl feeder to the loading hopper 10, and the loader or insertion device 11 which moves pins from the loading bin in the hopper to a pin insertion head 12. The main bowl feeder includes an inclined helical ramp extending on the interior or inner periphery of the bowl continuously from the bottom of the bowl to the top of the bowl. A vibrator vibrates the bowl in such a manner that pins dumped into the bowl in a random fashion, such as from a bulk container, are continuously moved up the interior helical ramp by vibratory action of the bowl and are fed into the loading hopper 10 through the pin delivery tube 9. The vibratory action of the bowl is common to the state of the art inasmuch as the bowl moves upward and forward and jumps downward and backward in the opposite directions of the starting point by leaving the pins, as it were, standing still in the air. When the pins again contact the ramp of the bowl, a different portion of the ramp contacts the pins and carries them forward again an incremental distance where the same action is repeated. The net effect of the vibratory or jumping motion of the feeder bowl is thus to move the pins slowly up the ramp where the pins are then fed through the delivery tube 9 into the loading hopper 10 for insertion into a head and ultimately into a circuit board. The movement of the pins up the inclined helical ramp within the bowl by the vibratory method is not unlike that of a helical screw thread in that something, such as pins, may be transported through a vertical and perhaps longitudinal distance while the means of transportation stays relatively in one location while movement is effected.

The inclined ramp is relatively narrow and thus the pins moving there are substantially straight with respect to the ramp. Any pins which are at an askew angle with respect to the ramp fall back into the bowl. Accordingly, when pins arrive at the top of the ramp, they are fed directly into the delivery tube 9 axially of the tube and are not fed to the tube in a random orientation such that blockage of the tube by pins lying across the tube could occur. The delivery tube 9 which is preferably made of plastic or glass, may include a circular ring disposed about the exterior periphery of the tube to prevent a buildup of static electricity which could in turn cause delivery problems of the pins as they feed into and through the tube to the loading hopper. The metal ring also serves to dampen excessive vibration on the tube contributed by the pin feeding system. The delivery tube may also be made of metal.

From the delivery tube 9, the pins move into the hopper 10 which includes a plurality of loading slots or bins. If the gravity fed selectable pin insertion device 11 is designed to insert a cluster of pins, the loading mechanism will include one slot or bin for each of the pins in the cluster. The pins are gravity fed from the tube to the loading bins in the hopper. The pins remain in alignment as they are fed into the respective bins. As one bin fills up the remaining pins spill over into the adjacent bin. This procedure is continued until the bins are all relatively full of pins or until a state of equilibrium is reached with respect to the supply of pins being fed into the loading mechanism and the number of pins being inserted into a circuit board. The horizontal pneumatic actuator 20 causes the pins to be moved from the insertion device 11 into the pin insertion head 12. The vertical pneumatic actuator 19 then causes the pins to be moved from the pin insertion head 12 into the board 6. The operation of the pin insertion head 12 may be more clearly seen by reference to the U.S. Pat. No. 3,713,197 "Pin Insertion Head" by Robert O. Crump, issued Jan. 30, 1973. If desired the pin insertion head 12 and the vertical pneumatic actuator 19 may be elminated. The boards may be mounted vertically adjacent the insertion device 11 and pins moved directly from the insertion device into the boards.

Figure 5:
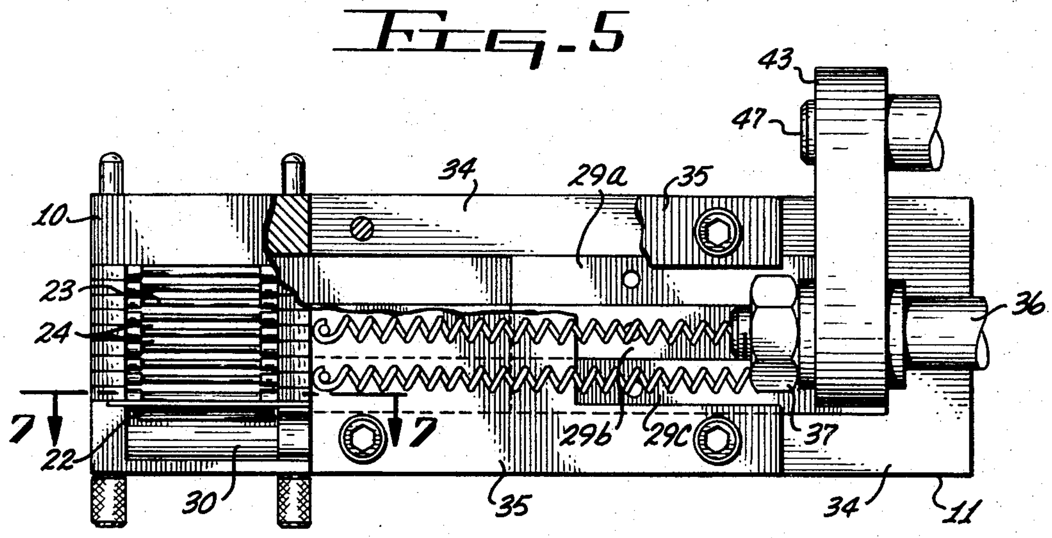
FIG. 5 is an enlarged view of a portion of the apparatus of FIG. 2.
Figure 6:
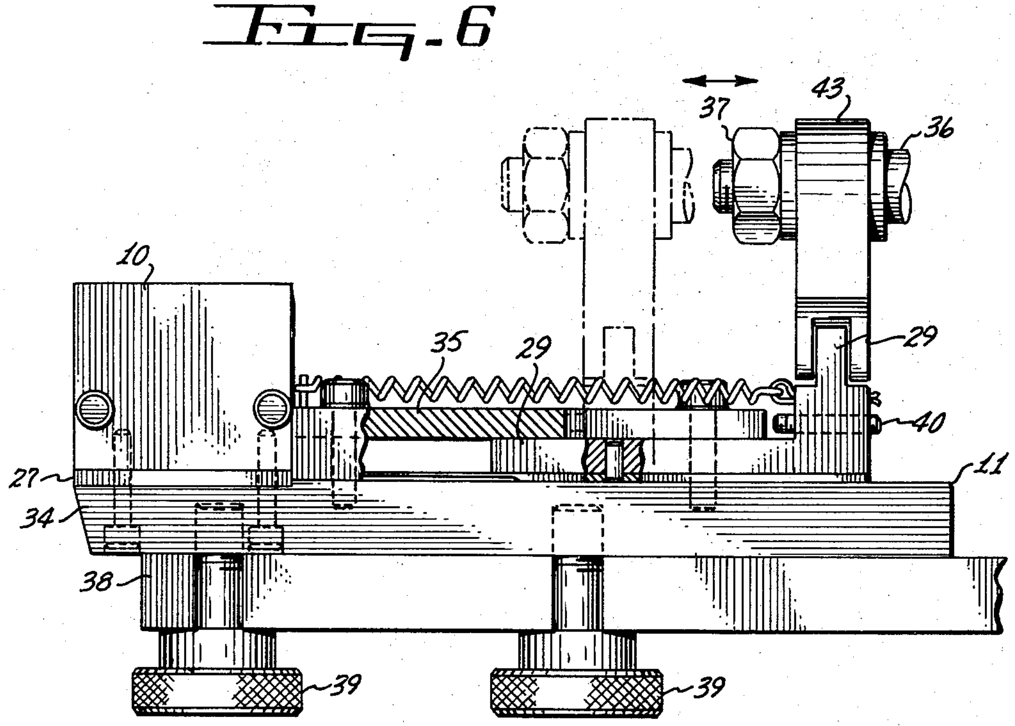
FIG. 6 is a side view of the device shown in FIG. 5.
Figure 7:
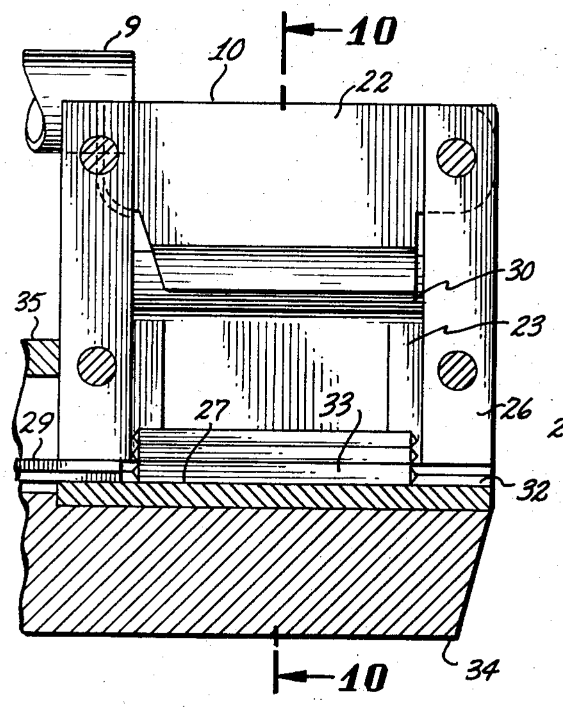
FIG. 7 is a sectional view taken along line 7—7 of FIG. 5.
Figure 8:
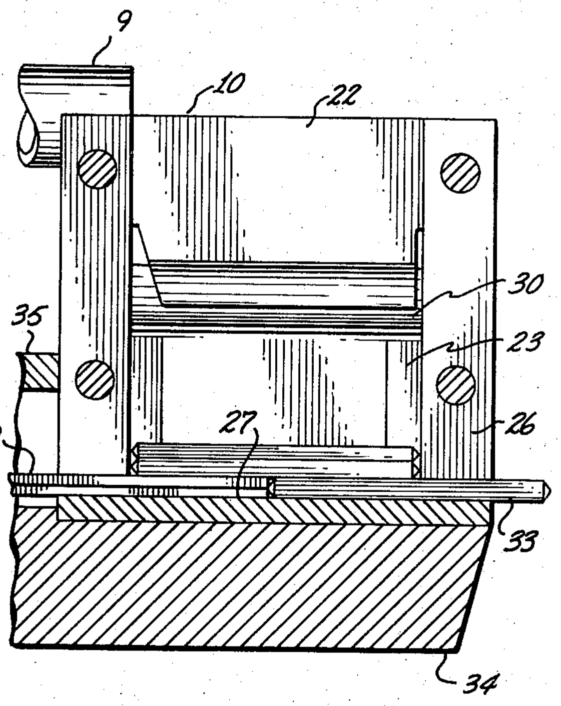
FIGS. 8–10 show details of one embodiment of the hopper portion of the present invention.
Figure 9:
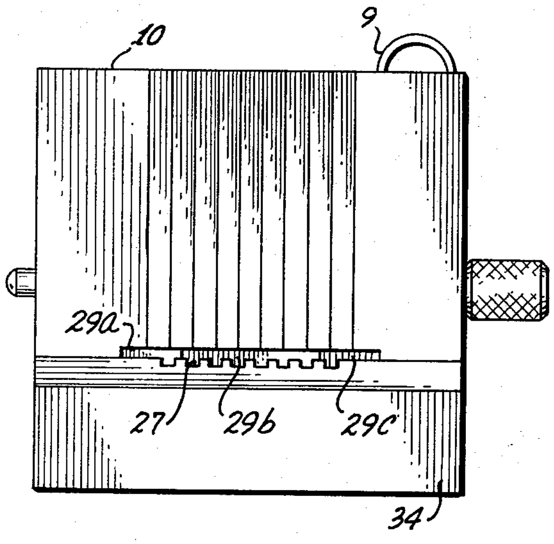
Figure 10:
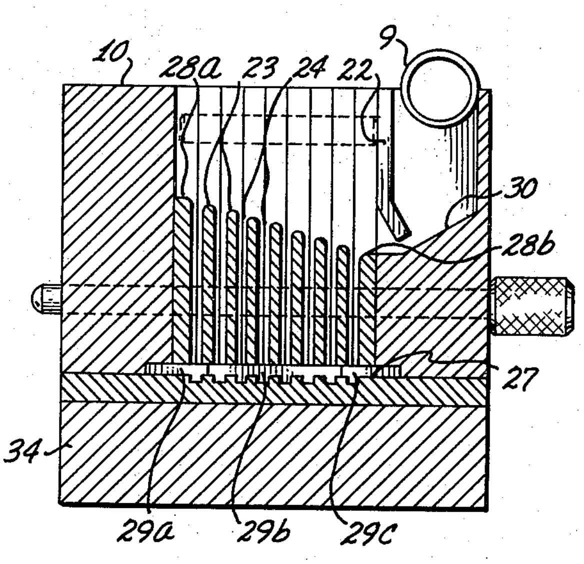

Details of the gravity-fed selectable pin insertion device 11 and the method of operation may be more clearly seen by referring to FIGS. 2–10. As shown in FIG. 10 the pins are dropped into the hopper 10 and are aligned by a plurality of partitions or spacer blades 23 into the spaces 24 between the blades. The pins are aligned so that one end of each pin is adjacent the forward wall 26 which has a plurality of holes or ports at the bottom of the hopper as shown in FIGS. 7 and 8. The position of the spacer blades 23, the spaces 24 between the blades, the bottom plate 27 and the side walls 28*a* and 28*b* can be more clearly seen by referring to FIG. 10. The distance between the blades 24 is slightly greater than the width of the pins being used but is substantially less than twice the width of the pins so that a single pin lies on the bottom plate 27 in each space 24 and other pins are stacked in a horizontal position on top of each of the bottom pins. The pins which are dropped into the hopper will be positioned in the spaces 24 so that each pin has one end adjacent the forward wall 26 as shown in FIG. 8 and the other end adjacent a pusher 29. Pusher 29 may be a single pusher or it may include a plurality of narrow pushers 29*a*, 29*b*, 29*c* as shown in FIGS. 9 and 10.

A baffle 22 shown at the righthand side of FIG. 10 aids in keeping the pins parallel to each other so that the pins move down the incline 30 and fill the first space 24 adjacent the side 28*b*. When this first space has been filled with pins, pins will then be moved into the second space and finally filling all of the spaces between the blades 23 shown in FIG. 10.

In FIG. 7 the pusher 29 is positioned to the left of the figure so that the edge of the pusher is adjacent one end of each of the pins lying on the bottom of the hopper. The other end of the pin is positioned adjacent a port or opening 32 in the front wall 26. When the pusher is moved to the right the edge of the pusher 29 makes contact with the left end of the lower pin 33 thereby causing the pin 33 to be moved through the port 32 in the front wall of the hopper. The edge of pusher 29 may be shaped to mate with the end of the pin 33 thus holding the pin parallel to the bottom of the hopper as the pin is moved through the port. As the pusher 29 continues toward the right the pin 33 is forced into a board (not shown) which is positioned to the right of the hopper shown in FIGS. 7 and 8 or the pins may be moved into an insertion head of the type shown in FIG. 1.

When the pusher 29 has moved all the way to the right so that the lower pins 33 are forced into the board, the board can be moved and the pusher moved back to the left into the position shown in FIG. 7. At this time other pins will drop into position on the bottom plate 27 so that the next time pusher 29 moves to the right pins will again move through the ports 32 into the boards to the right of FIG. 8.

A plurality of pushers may be used as shown in FIGS. 9 and 10 so that pins may be selectively moved through the ports into the boards or into the insertion head shown in FIG. 1. As shown in FIG. 9 the pusher 29*a* moves only one pin through the port 32 into the circuit board each time that the pusher is activated. Pusher 29*b* may move a plurality of pins into the circuit boards while 29*c* moves only one pin as shown in FIGS. 9 and 10. It should be understood that other combinations of pins may be inserted into circuit boards by changing the width of the pushers 29*a*–29*c*. The bottom plate 27 which is also the bottom of the hopper 10 is mounted on the base plate 34 as shown in FIGS. 5 and 6. A pusher 29 is movably mounted inside the stop plate 35. The pusher is moved by power supplied from the push rod 36 which is connected to the pusher 29 by a nut 37. The hopper and the bottom plate 27 are secured to the support plate 38 by a pair of bolts 39 as shown in FIG. 6. The stop plate 35 and the stop bolt 40 limit the distance of travel of the pusher 29.

Figure 2:
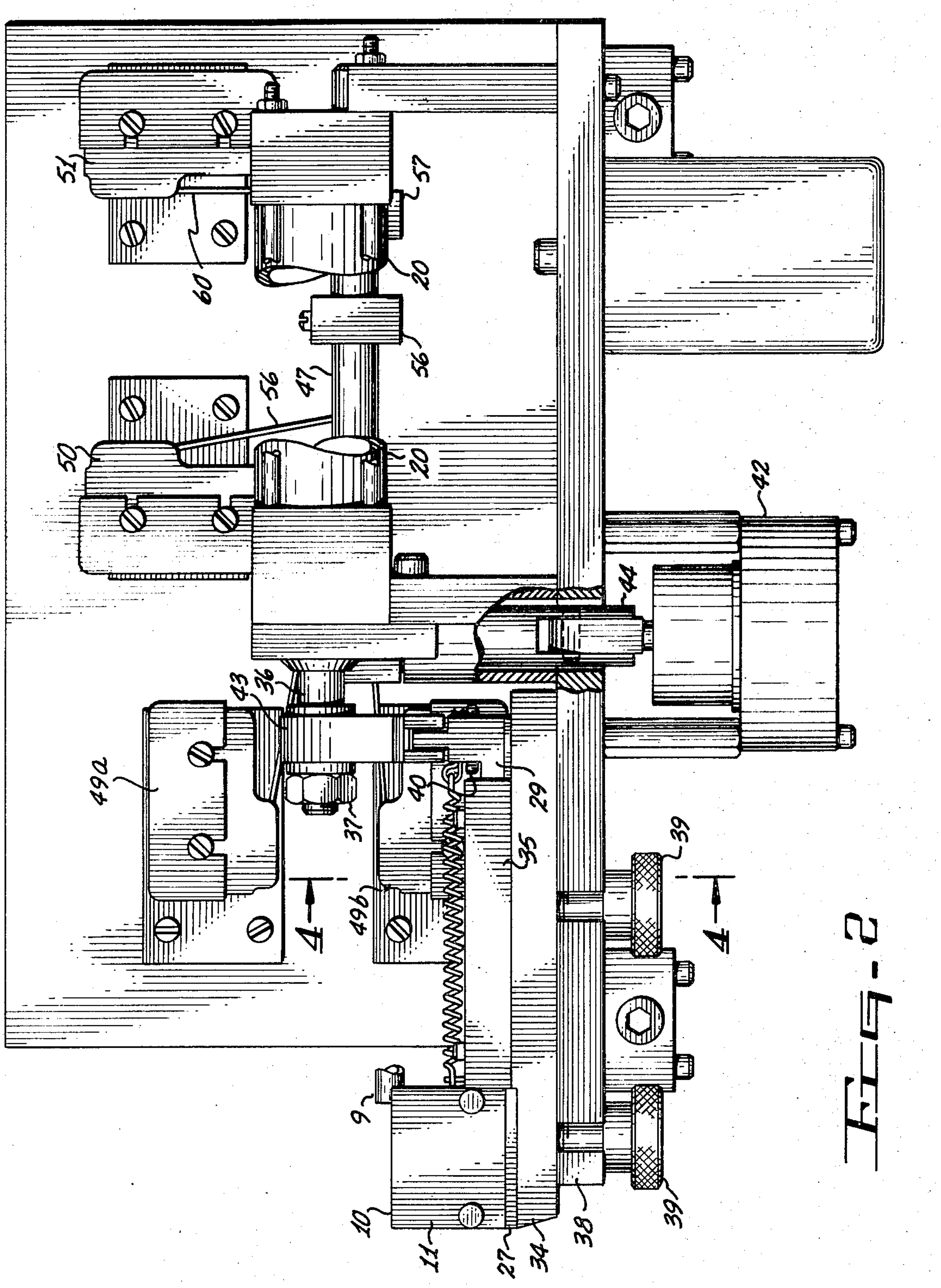
FIG. 2 is a side view of the device of the present invention.
Figures 3, 4:
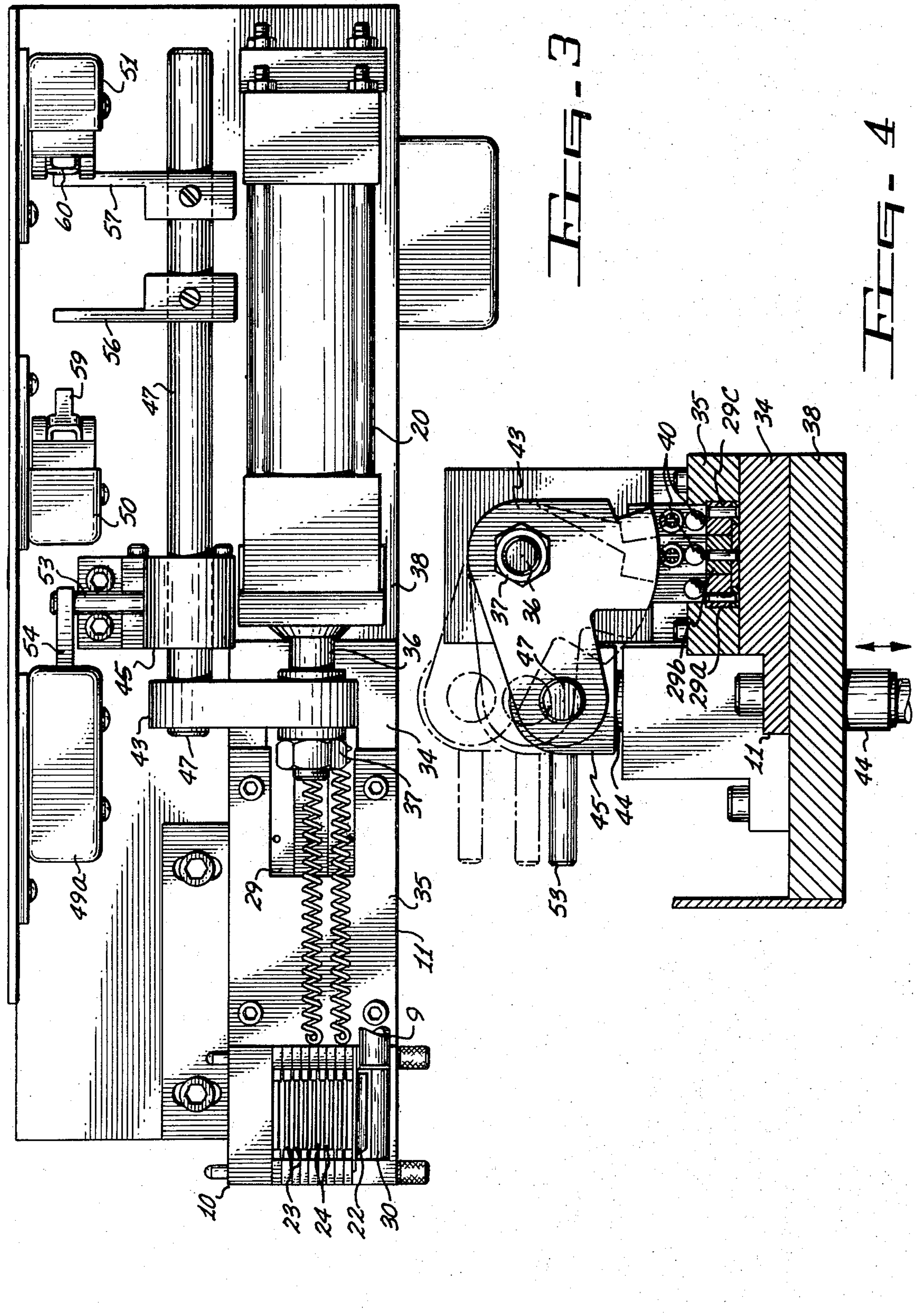
FIG. 3 is a top view of the device of the present invention.
FIG. 4 is a sectional view taken along line 4—4 of FIG. 2.

Details of the apparatus for selectively operating the pushers 29*a*–29*c* can be more clearly seen by referring to FIGS. 1–6. As shown in FIG. 6 the righthand end of the pusher 29 is positioned between two portions of an arm 43 which is movable from left to right. The pushrod 36 provides power to the arm 43 thereby causing the arm to move horizontally and to move the pusher 29 into and out of the bottom portion of the hopper 10. As shown in FIG. 4 the arm 43 makes contact with all of the pushers **29*a*–29*c* when in the solid line position and makes contact with only a portion of these pushers as the arm 43 is pivoted about the axis of the pushrod 36. When the arm 43 is rotated into the extreme clockwise position shown in FIG. 4 the arm makes contact only with the end of the pusher 29*a* so that pusher 29*a* is moved into the bottom of the hopper 10 while pushers 29*b* and 29*c* are not activated. When the arm is moved to the mid position shown in FIG. 4 pushers 29*a* and 29*b* are moved into the bottom of the hopper 10. When the arm is in the counterclockwise position pushers 29*a*, 29*b*, and 29*c* are all activated thereby causing the pins to be moved through all of the ports of the hopper which were shown in FIGS. 7–10. If desired, the bottom portion of the arm 43 can be formed so that only one of the pushers 29*a*–29*c* makes contact with the arm at any one time, thus the pins can be selectively moved through ports in either side or in the middle of the hopper 10 shown in FIGS. 9 and 10.**

Means for rotating the arm 43 into any of the three desired positions can be seen by referring to FIGS. 1–4. As seen in FIGS. 1 and 2 a pneumatic source 42 is connected to a vertical rod 44. As seen in FIGS. 2 and 4 the vertical rod 44 is connected to a member 45 having a horizontal shaft 47 mounted therethrough. An inner surface of the member 43 is a bearing which holds the horizontal shaft 47. As the vertical rod 44 is moved upward, the member 45 is also moved upward, thereby causing the horizontal shaft 47 to move upward and causing the arm 43 to rotate in a clockwise position. Also attached to the member 45 is a horizontal finger 53 which projects to the left as shown in FIG. 4. When the finger 53 is moved to the extreme upward position it pushes against a contact 54 shown in FIGS. 1 and 3 causing the contact to move up and to activate an upper limit switch **49*a*. In a similar manner when the finger 53 is at the extreme bottom position it pushes against another contact (not shown) which activates a lower limit switch 49*b*.**

When the pushrod 36 moves the arm 43 toward the hopper horizontal shaft 47 moves to the left causing another finger 56 in FIGS. 1 and 3 to press against a contact 59 of the left limit switch 50. Also when the pushrod 36 and arm 43 are moved to the extreme righthand position shown in FIG. 3, another finger 57 presses against a contact 60 in the right limit switch 51. These limit switches provide control signals for the machine interface (not shown) to tell the interface that the arm 43 and the pushers have reached the limit of their normal travel and that another portion of the operation can be performed.

Figures 11, 12, 13:
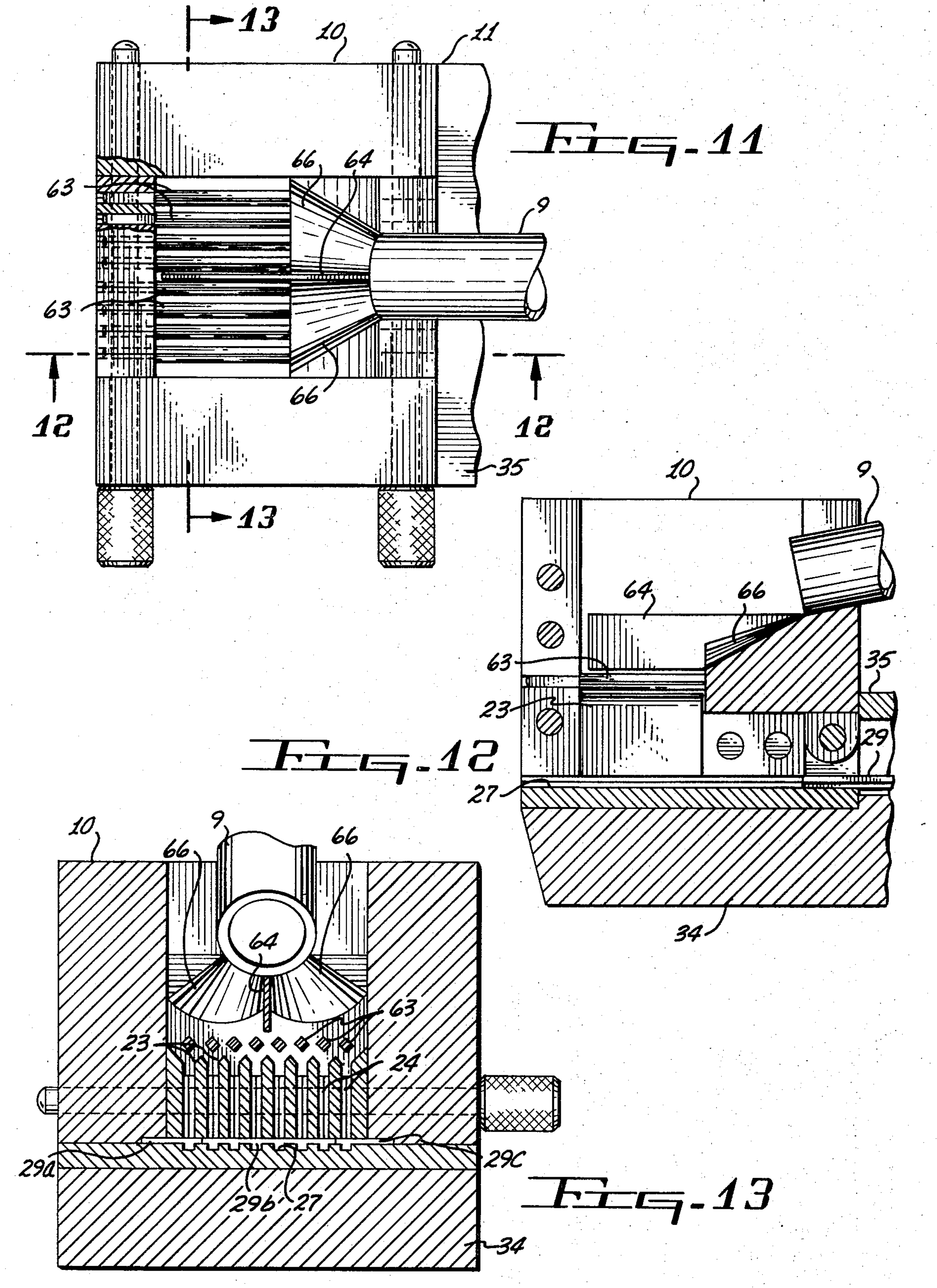
FIGS. 11–13 show another embodiment of a hopper which may be used in the present invention.

FIGS. 11–13 disclose another embodiment of the hopper, which is especially adapted for use with shorter pins. The shorter pins have a tendency to stand on end in the space between the partitions 23. A plurality of rods 63 is mounted horizontally with one rod above each of the spaces between the partitions as shown in FIG. 13. These rods prevent the pins from standing on end in the space between the partitions. To prevent the shorter pins from being positioned across the rods a baffle 64 divides the sloping surface 66 between the delivery tube 9 and the hopper into two sections so that the shorter pins cannot be positioned across the hopper.

While the principles of the invention have now been made clear in an illustrative embodiment, there will be many obvious modifications of the structure, proportions, materials and components without departing from those principles. The appended claims are intended to cover any such modification.

We claim:

1. A gravity-fed selectable pin insertion device comprising:

a hopper having a forward wall with a plurality of ports at the base of said wall for the passage of pins therethrough;

a plurality of spaced partitions mounted in said hopper, said partitions being positioned so that the distance between adjacent partitions is slightly greater than the width of a pin but considerably less than twice the width of said pin, said partitions being positioned so that each pin lying on the bottom of said hopper has a first end adjacent a corresponding one of said ports;

a plurality of pushers, each of said pushers being positioned adjacent a second end of at least one pin lying on the bottom of said hopper, each of said pushers being moveable toward said wall to move each of said adjacent pins on said bottom through a corresponding one of said ports; and means for selectively moving said pushers toward said wall.

2. A gravity-fed selectable pin insertion device as defined in claim 1 wherein:

each of said pushers has a groove in one edge thereof, said groove being adapted to mate with the end of each of said pins, said groove and each one of said ports holding a corresponding one of said pins in alignment with said port while said pins are being moved through said ports.

3. A gravity-fed selectable pin insertion device as defined in claim 1 including:

a source of pins, said source being positioned above said hopper, said source dropping pins into said hopper.

4. A gravity-fed selectable pin insertion device comprising:

a hopper having a forward wall with a plurality of ports at the base of said wall for the passage of pins therethrough;

a plurality of spaced partitions mounted in said hopper, said partitions being positioned so that the distance between adjacent partitions is slightly greater than the width of a pin but considerably less than twice the width of said pin, said partitions being positioned so that each pin lying on the bottom of said hopper has a first end adjacent a corresponding one of said ports;

a plurality of pushers, each of said pushers being positioned adjacent a second end of at least one pin lying on the bottom of said hopper, each of said pushers being moveable toward said wall to move each of said adjacent pins on said bottom through a corresponding one of said ports;

means for selectively moving said pushers toward said wall;

a source of pins, said source being positioned above said hopper, said source dropping pins into said hopper; and means for moving said pushers away from said forward wall.

* * * * *